United States Patent [19]

Yajima et al.

[11] Patent Number: 4,634,037

[45] Date of Patent: Jan. 6, 1987

[54] SPRING CLAMP DELIVERY DEVICE FOR PIPE MATERIAL WELDING APPARATUS

[75] Inventors: Yutaka Yajima; Kazuyoshi Matsushita, both of Akishima, Japan

[73] Assignee: Tachikawa Spring Co., Ltd., Tokyo, Japan

[21] Appl. No.: 620,324

[22] Filed: Jun. 12, 1984

[51] Int. Cl.$^4$ ............................................. B23K 37/04
[52] U.S. Cl. ...................................... 228/6.1; 29/809; 219/86.24
[58] Field of Search ................. 219/80, 86.24; 228/6.1; 29/809

[56] References Cited

U.S. PATENT DOCUMENTS

| | | | |
|---|---|---|---|
| 3,233,072 | 2/1966 | Garver et al. | 219/80 X |
| 3,855,687 | 12/1974 | Moriguchi et al. | 29/809 |
| 4,409,459 | 10/1983 | Nakayama | 219/86.24 |

Primary Examiner—Frederick R. Schmidt
Assistant Examiner—Steven P. Schad
Attorney, Agent, or Firm—Cushman, Darby & Cushman

[57] ABSTRACT

A device for delivering spring clamps is disclosed, which spring clamps are welded to a pipe frame for a vehicle seat so as to extend spring members across such pipe frame. In this spring clamp delivery device, a movable delivery mechanism is operated to charge the spring clamps that are discharged via a transfer rail from a supply hopper individually into a plurality of chutes which are provided in the movable delivery mechanism substantially at the same intervals as those of the spring clamps relative to the pipe material, and then to deliver such spring clamps to the pipe material that has been set in a welding machine. Thus, even if varied in size, the spring clamps can be delivered to the pipe material in such a positive manner that they can be positioned to correspond to the predetermined positions of the pipe material.

3 Claims, 8 Drawing Figures

U.S. Patent Jan. 6, 1987 Sheet 1 of 3 4,634,037
FIG. 1
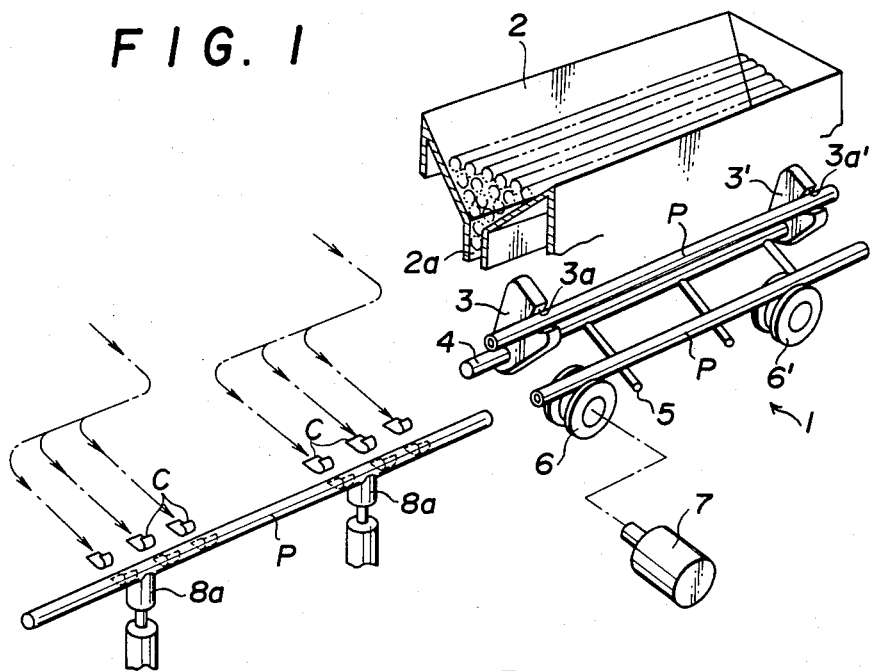
FIG. 2
FIG. 8
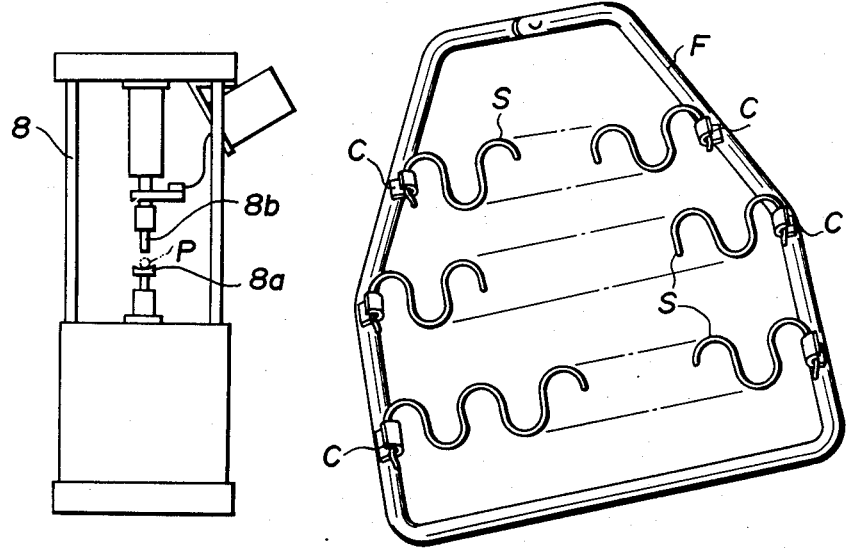

SPRING CLAMP DELIVERY DEVICE FOR PIPE MATERIAL WELDING APPARATUS

BACKGROUND OF THE INVENTION

1. Field of the Invention

The present invention relates to an improved spring clamp delivery device for use in an apparatus for forming pipe frames such as a seat frame for a vehicle seat which delivers spring clamps for extending spring members.

2. Description of the Prior Art

A seat frame for a vehicle seat includes spring members for supporting a seat pad, and thus spring clamps are welded to both side portions of the seat frame so as to extend such spring members.

Conventionally, a seat frame of this type is formed by bent-forming a pipe material into a predetermined configuration and thereafter welding spring clamps to both side portions of the bent-formed pipe member. In such seat frame, however, it has been difficult to automate operations for supplying pipe materials of a frame configuration to a spring clamp welding mechanism and for setting the spring clamps to such welding mechanism, so that it has been impossible to enhance the production efficiency of such conventional seat frame.

SUMMARY OF THE INVENTION

In view of the foregoing circumstances, the present inventors intend to propose an improved pipe frame forming system in which a plurality of spring clamps are welded to a linearly-shaped pipe material and thereafter such pipe material is bent formed into a frame configuration.

Accordingly, it is a principal object of the invention to provide an improved spring clamp delivery device for use in such improved pipe frame forming system which is capable of accurately delivering such spring clamps to the predetermined positions of the pipe material in a welding machine.

In accomplishing this object, according to the invention, spring clamps to be discharged through a transfer rail from a supply hopper are fed individually into a plurality of chutes, which are provided in a movable delivery mechanism at the same intervals as such spring clamps are spaced from the pipe material, by moving the delivery mechanism, and are then delivered to the pipe material which has been set in the welding machine.

Therefore, according to the present invention, even if the spring clamps vary in size, they can be always delivered precisely to their predetermined positions in the pipe material and thus can be welded to such positions in an accurate and positive manner. Accordingly, when the invention is incorporated into such pipe frame forming system, such pipe frame including spring clamps can be formed fully automatically and at the same time such spring clamps can be welded accurately to their predetermined positions with respect to such pipe frame, so that uniform products can be obtained as well as the yield rate of the products can be improved.

Other objects and advantages of the invention will become apparent during the following discussion of the accompanying drawings.

BRIEF DESCRIPTION OF THE DRAWINGS

FIG. 1 is a perspective view of main portions of a pipe material supply and take-out device in a pipe frame forming system;

FIG. 2 is a front view of a spring clamp welding machine;

FIG. 8 is a perspective view of a pipe frame formed by using the spring clamp delivery device of the present invention.

DETAILED DESCRIPTION OF A PREFERRED EMBODIMENT OF THE PRESENT INVENTION

Figure 3:
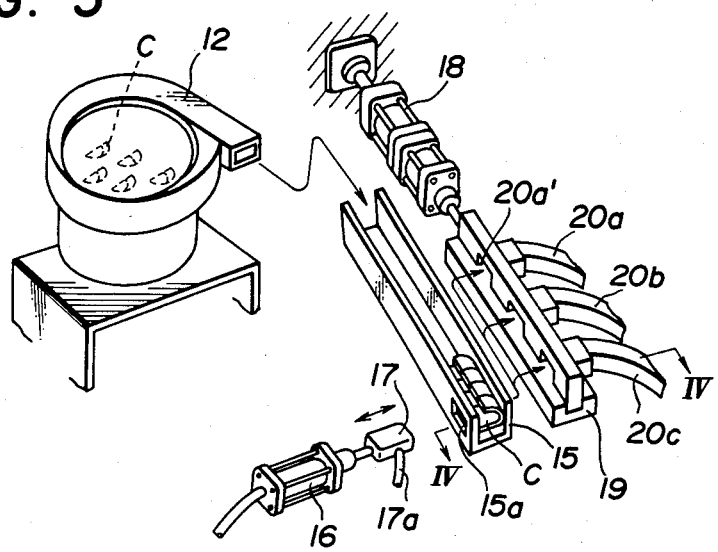
FIG. 3 is a perspective view of main portions of a spring clamp delivery device constructed in accordance with the present invention.

FIG. 1 illustrates a pipe material suppy and take-out device in a pipe frame forming system and, in this Figure, numeral (1) designates a take-out device which is arranged below a discharge port (2a) of a supply hopper (2) to take out pipe materials P forming pipe frames F one by one. This take-out device (1) comprises a receiving mechanism wherein a pair of receiving plates (3), (3') respectively provided with pipe material receiving grooves (3a), (3a') are journalled to a shaft of rotation (4), and a feeding mechanism wherein a guide member (5) is positioned in a direction of rotation of the receiving plates (3), (3'), feed rollers (6), (6') are provided via such guide member (5), and these rollers (6), (6') are driven and rotated by a motor (7).

Forwardly of the take-out device (1) is arranged a pipe material setting mechanism (8a) which is provided in a spring clamp welding machine (8) as shown in FIG. 2 in such a manner to correspond to the take-out device (1).

A spring clamp delivery device constructed in accordance with the present invention is so arranged as to correspond to such pipe material setting mechanism (8a).

Figure 4:
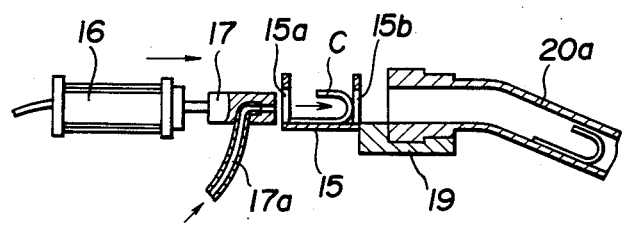
FIG. 4 is an enlarged section view taken along line IV—IV in FIG. 3.

FIGS. 3 and 4 illustrate the spring clamp delivery device of the invention. Specifically, the illustrated spring clamp delivery device comprises a supply hopper (12), a transfer mechanism rail (15) and a delivery mechanism (i.e. 18, 19, 20a, 20b, 20c as will be described later) for spring clamps C bent formed into a J-shaped configuration so as to be able to hook the ends of spring members S.

The supply hopper (12) includes a rotation lining mechanism which lines up the spring clamps C supplied thereinto to discharge them via a discharge port of the supply hopper (12) into the transfer rail (15). The tip end of this transfer rail (15) is formed at its side surfaces respectively with openings (15a), (15b) which extend in a direction to intersect with the longitudinal direction of the transfer rail and have a width equal to or slightly smaller than those of the spring clamps C. An extrusion body (17) having an air feed section (17a) and adapted to be slidable by an air cylinder (16) is arranged in such a manner to correspond to one opening (15a) of the transfer rail (15). When the extrusion body (17) is slid forwardly and is inserted into the transfer rail (15)

through the opening (15a), it extrudes the spring clamps C through the other opening (15b) from the transfer rail (15) by means of the pressure of air fed from the air feed section (17a). When the extrusion body (17) is slid backwardly and is removed outwardly of the transfer rail (15) via the one opening (15a), a next one of the spring clamps C will be situated between the openings (15a) and (15b) in the transfer rail (15).

The aforementioned delivery mechanism comprises a displacement member (19) to be slid by another air cylinder (18) adjacently to the other opening (15b) and in a direction to intersect with the direction of the two openings (15a) and (15b) in the transfer rail (15), and a plurality of chutes (three chutes are shown in this embodiment), (20a) (20b), (20c) which are arranged substantially at the same intervals as those of the spring clamps relative to the pipe material and in a direction to intersect with the displacement direction of the displacement member (19). Each of the chutes (20a), (20b), (20c) has a top end which is integrally connected with a welding jig (30).

Figure 5:
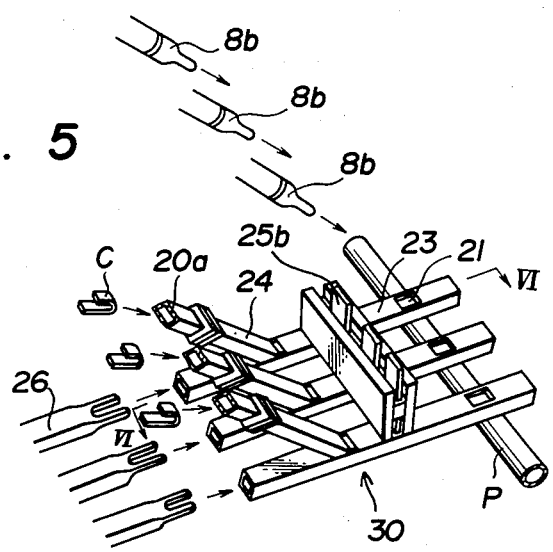
FIG. 5 is a perspective view to illustrate welding jigs.
Figure 7:
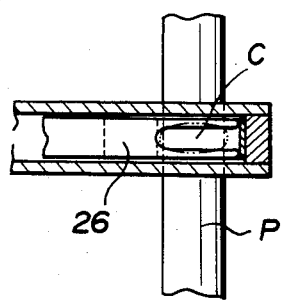
FIG. 7 is a section view taken along line VII—VII in FIG. 6.
Figure 6:
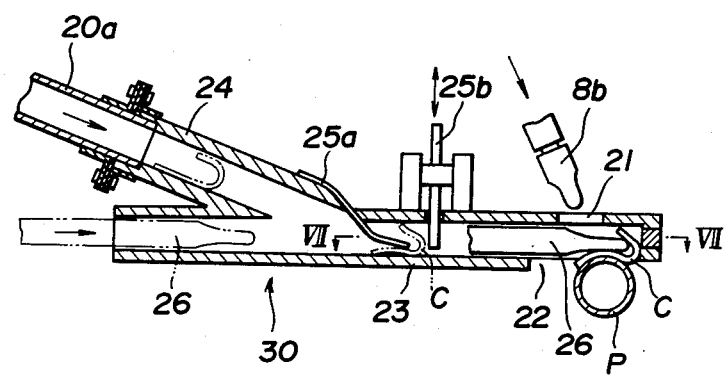
FIG. 6 is an enlarged section view taken along line VI—VI in FIG. 5.

FIGS. 5, 6 and 7 illustrate examples of such welding jigs (30) which are respectively so arranged to be located adjacent to the upper side of the pipe material P set in the welding machine (8). Each of the illustrated welding jigs (30) has a forward end which is formed with an insertion opening (21) for a welding gun (8b) on its upper surface side as well as with a fall opening (22) for the spring clamps C on its lower surface side. Each welding jig (30) comprises a guide member (23) which is formed with the above-mentioned insertion opening (21) and fall opening (22) and a connection member (24) which is inserted into this guide member (23) and also connects with one of the above-mentioned chutes (20a). Stoppers (25a) and (25b) are provided between the insertion opening (21) formed in the guide member (23) and the portion where the connection member (24) is inserted into the guide member (23). The spring clamps C that are fed into the guide member (23) through the connection member (24) from one of the chutes (20a), therefore, are abutted against these stoppers (25a), (25b) and are stopped there. These stoppers (25a) and (25b) respectively comprise a plate spring (25a) and a slide piece (25b) adapted to be free to slide in a vertical direction.

Within the guide member (23) there is provided a supply rod (26) adapted to be reciprocated by an air cylinder (not shown). This supply rod (26) includes a leading end which is formed in a U-shaped configuration so that, while retained by such U-shaped end, the spring clamps C can be welded to the pipe material P by the welding gun (8b). In other words, the supply rod (26) can be operated to extrude the spring clamps C from the positions in which they are caused to stop by the stoppers (25a), (25b), to move them up to the insertion opening (21) for the welding gun (8b), and to hold such spring clamps C while they are welded by the welding gun (8b). After completion of such welding, the supply rod (26) returns back to its original position and again extrudes the next spring clamps C from their position where they are stopped by the stoppers (25a), (25b) to move them up to the insertion opening (21) for the welding gun (8b).

Next, we will describe the operation of the thus constructed spring clamp delivery mechanism.

At first, a great number of spring clamps C are charged into the supply hopper (12), and the rotation lining mechanism in the supply hopper (12) is driven to line up the charged spring clamps C and to discharge such spring clamps C sequentially one by one through the discharge port (12a) into the transfer rail (15). On the other hand, the air cylinder (18) is driven to slide the displacement body (19) in the delivery mechanism so that the rearward mouth (20a') of the first chute (20a) is positioned to correspond to the other opening (15b) of the transfer rail (15).

Then, when the air cylinder (16) is operated to slide the extrusion body (17) forward and insert it within the transfer rail (15) via the one opening (15a) thereof, the spring clamp C is pushed out through the other opening (15b) thereof and is then charged into the first chute (20a) of the displacement member (19) located as opposed to the other opening (15b), by means of the rearward mouth (20a') thereof.

Next, the air cylinder (18) is operated to slide the the displacement member (19) so that the rearward mouth (20b') of the second chute (20b) is positioned as opposed to the other opening (15b) of the transfer rail (15) and thereafter the spring clamp C is charged into the second chute (20b) in the same manner as mentioned above. Further, in the manner similar to the above-mentioned manner, the displacement member (19) is slid and the spring clamp C is sent into the third chute (20c) from the transfer rail (15).

The spring clamps C charged into chutes (20a), (20b), (20c) in this manner are caused to stop in place by the stoppers (25a) and (25b) of the respective welding jigs (30) respectively connected to these chutes, and are then extruded from such positions by means of actuation of the supply rod (26) so that they are located to oppose the predetermined positions of the pipe material P which has been already set in the pipe material setting mechanism (8a) of the welding machine (8).

After then, while the welding machine (8) is operated to insert the welding guns (8b) through the respective insertion openings (21) provided on the upper surface side of the forward ends of the chutes (20a), (20b), (20c), the spring clamps C are pushed out through the respective drop openings (22) provided on the lower surface side of the same forward ends thereof, so that the spring clamps C can be brought into contact with the associated pipe material P and can be then welded to such pipe material P.

Briefly referring to FIG. 8, that is a perspective view of a pipe frame formed by using the delivery mechanism of the invention, illustrating the state wherein spring members S are extended between and secured to the spring clamps C that have been welded according to the present invention.

The spring clamps C are welded to the pipe material P in a right and left symmetrical manner, as shown in FIG. 1. For this reason, the spring clamp delivery device (11) is arranged in a right and left symmetrical manner with respect to the welding machine (8) and also the welding guns of the welding machine (8) are disposed in a right and left symmetrical manner.

What is claimed is:

1. A spring clamp delivery device for a pipe material welding apparatus adapted for welding spring clamps to a linearly-shaped pipe material, said spring clamp delivery device including a pipe material supply mechanism for supplying pipe materials and means for setting a position for welding spring clamps to said pipe material, said device comprising:

a transfer rail adapted to receive and supply said spring clamps in a lined-up manner, said transfer rail being disposed in a facing relationship with said pipe material and having an opening formed in both lateral surfaces of its forward end portion, said opening being aligned in a direction substantially crossing the longitudinal direction of said transfer rail;

a delivery mechanism interposed between said transfer rail and said pipe material, said delivery mechanism being slidable longitudinally of said pipe material and having a plurality of chutes disposed at intervals corresponding to each welding position of said spring clamps on said pipe material, each of said chutes being so arranged that the rearward mouth thereof is so positioned as to correspond to said opening formed in said transfer rail each time said delivery mechanism is moved and further each of said chutes being so arranged that on the upper surface of its forward end portion, an insertion opening is formed for allowing a welding gun to move therethrough for welding said spring clamps to said pipe material and on the lower surface of said chute's forward end portion is formed a drop opening for permitting said spring clamps to drop therethrough onto said pipe material; and an extrusion body provided at one of said lateral surfaces of said transfer rail in such a manner as to correspond to said opening, said extrusion body being adapted to move in a direction substantially crossing the alignment direction of said opening formed in both lateral surfaces of said forward end portion of said transfer rail so as to push out said spring clamp from within said transfer rail and into one of said plurality of chutes, whereby said delivery mechanism is moved along the longitudinal direction of said transfer rail so that said rearward mouth of each of said chutes is positioned at a point corresponding to one of said openings of said transfer rail and then one of said spring clamps in said transfer rail is pushed by said extrusion body to enter into said rearward mouth of each of said chutes and is transferred through said chutes to reach the forward end portion of said chute.

2. The spring clamp delivery device as claimed in claim 1, wherein said pipe material supply mechanism comprises a take-out device for taking out said pipe materials one by one from a supply hopper and a pipe material setting mechanism provided in a spring clamp welding machine.

3. The spring clamp deliver device in accordance with claim 1, wherein said delivery mechanism is moved by an air cylinder such that the rearward mouth of each of said chutes is so positioned as to correspond to said opening formed in said transfer rail.

* * * * *